Figure 1:
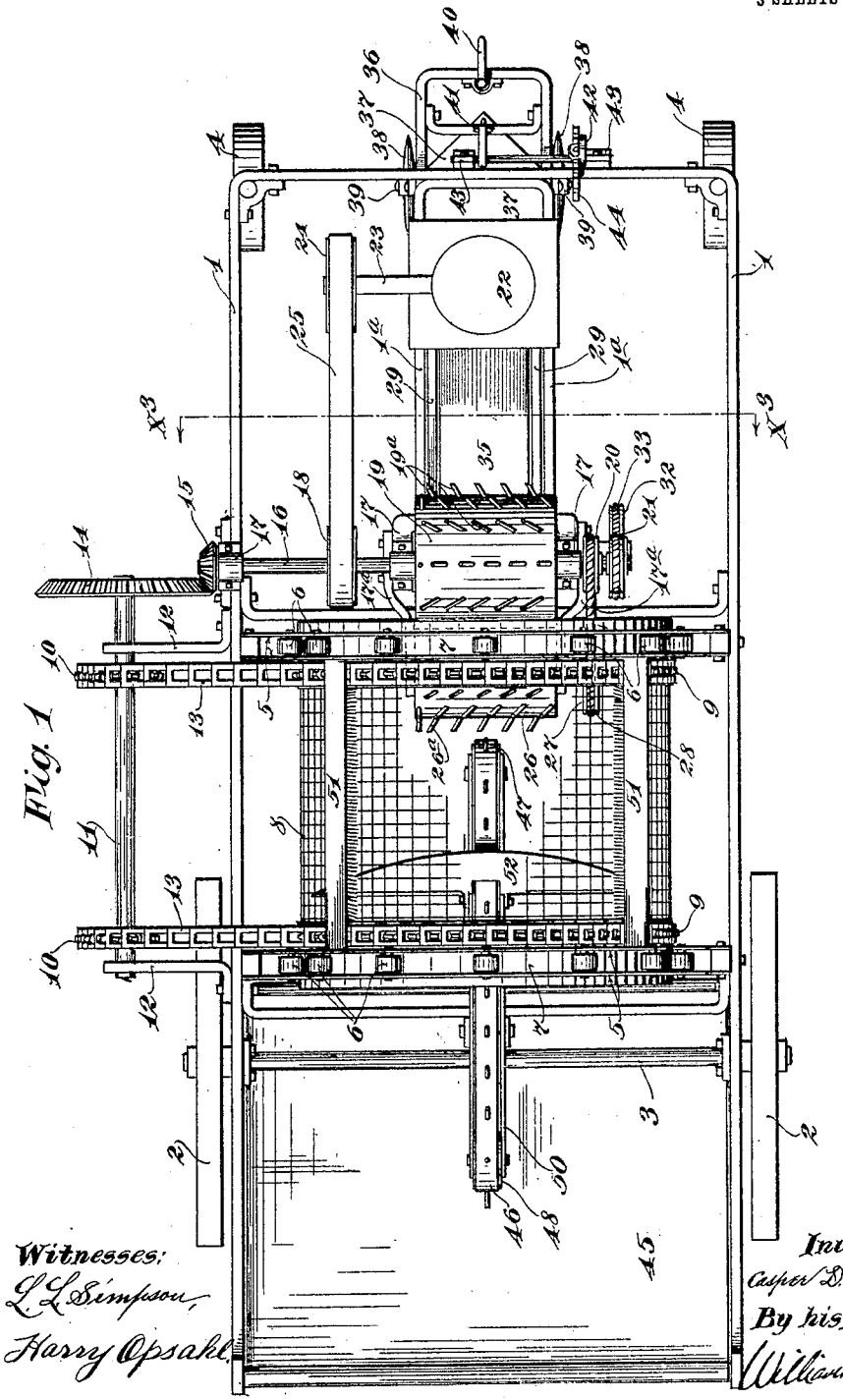

No. 910,168.

APPLICATION FILED MAY 4, 1908.

Patented Jan. 19, 1909.

3 SHEETS—SHEET 1.

Witnesses:
L. L. Simpson,
Harry Opsahl.

Inventor:
Casper D. Brackelsberg
By his Attorneys:
William Meehan

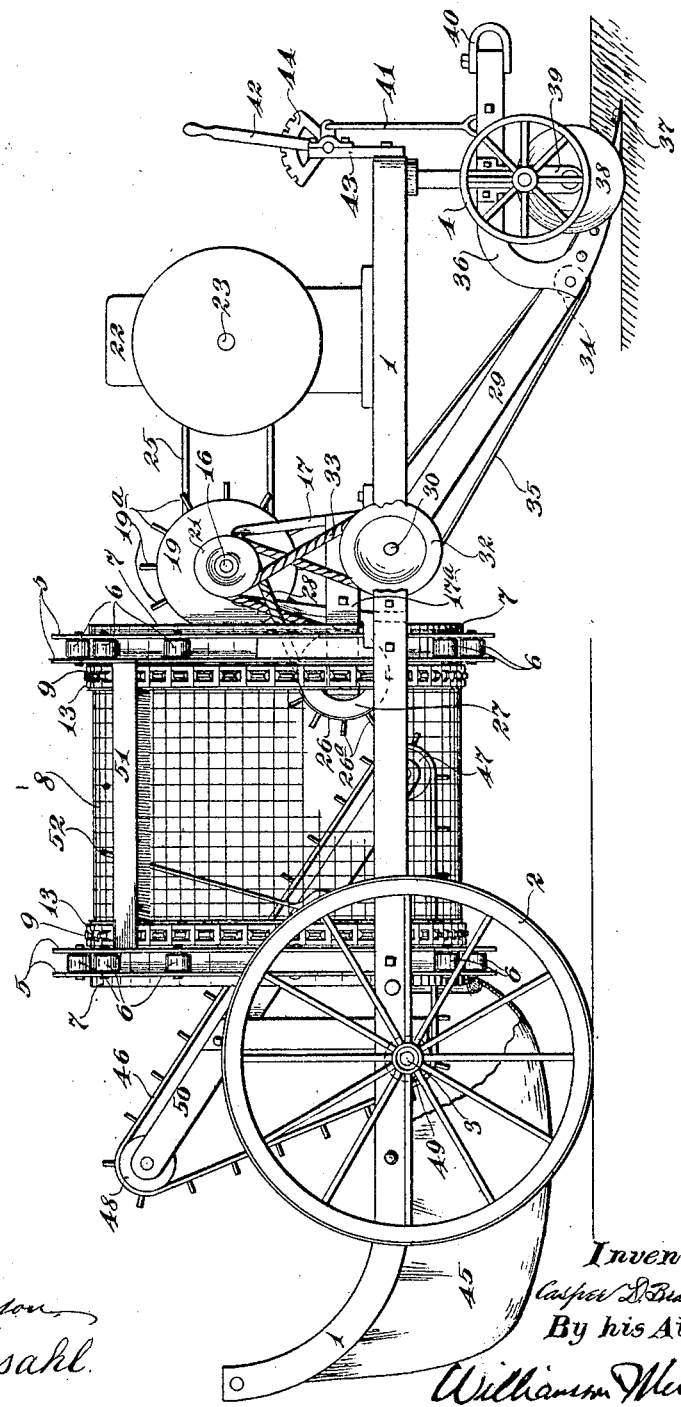

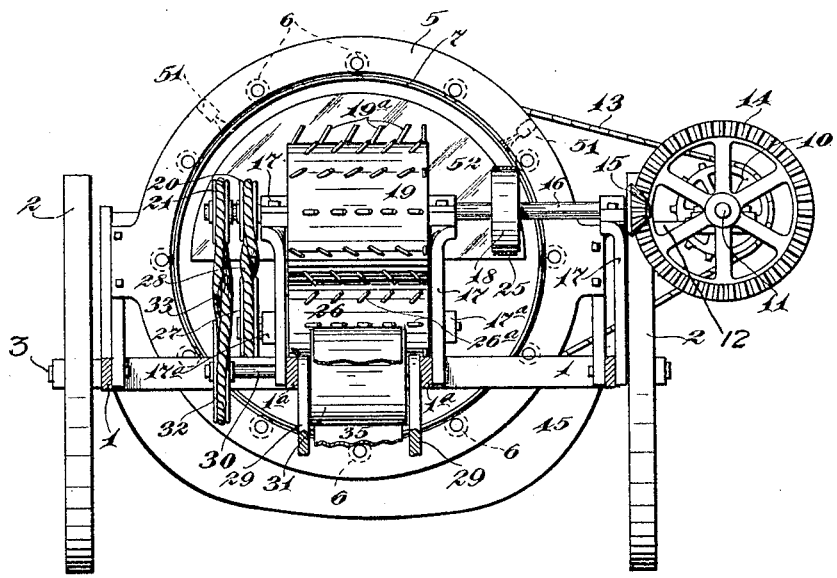

UNITED STATES PATENT OFFICE.

CASPER D. BRACKELSBERG, OF MADELIA, MINNESOTA.

QUACK-GRASS DIGGER.

No. 910,168.      Specification of Letters Patent.      Patented Jan. 19, 1909.

Application filed May 4, 1908. Serial No. 430,701.

*To all whom it may concern:*

Be it known that I, CASPER D. BRACKELSBERG, a citizen of the United States, residing at Madelia, in the county of Watonwan and State of Minnesota, have invented certain new and useful Improvements in Quack-Grass Diggers; and I do hereby declare the following to be a full, clear, and exact description of the invention, such as will enable others skilled in the art to which it appertains to make and use the same.

My invention has for its object to provide an improved machine for digging quack grass; and to this end it consists of the novel devices and combinations of devices hereinafter described and defined in the claims.

As is well known, quack grass grows profusely in cultivated farm lands, and, in many instances, is so destructive to crops and makes the cultivation of the soil so difficult that it makes large tracts of farm land practically worthless. The extermination of quack grass from the soil in which it has obtained a footing has been found to be an extremely difficult matter.

My improved machine will dig up this quack grass, separate the roots thereof from the soil, deposit the loosened soil again on the ground and deliver the quack grass with cleaned roots in a suitable receptacle, thus making it possible to collect the quack grass and burn or otherwise destroy the same.

In the accompanying drawings which illustrate the invention, like characters indicate like parts throughout the several views.

Referring to the drawings, Figure 1 is a plan view of the improved machine. Fig. 2 is a side elevation of the same. Fig. 3 is a transverse vertical section taken on the line $x^3$ $x^3$ of Fig. 1; and Fig. 4 is a detail view in plan, showing the plow and immediately connected devices.

The machine frame 1 is of rectangular skeleton form, being preferably made up of metallic bars. The rear portion of this frame is supported by large wheels 2 fixed on the ends of an axle 3 that is journaled in suitable bearings on the sides of the frame 1. The front end portion of said frame is supported by suitable wheels 4 located below the front corners of said frame.

Rigidly secured to the sides of the frame 1 is a pair of parallel annular wheel racks 5, each of which is made up of a pair of laterally spaced heavy metal rims, between which short rollers or anti-friction wheels 6 are journaled. Mounted to rotate on these wheels 6 is a separating drum or cylinder made up of annular metal end bands 7, secured to the ends of a reticulate cylinder section 8, the latter of which has coarse mesh and is made up of rods or quite heavy wires. The annular end bands 7 run directly on the wheels 6 so that the reticulate cylinder is supported for rotary movement on an axis extending longitudinally of the machine. Each end band 7 is provided with sprocket teeth 9 that aline with sprockets 10 carried by a counter-shaft 11 mounted in suitable bearing brackets 12 secured to one side of the machine frame 1. Sprocket chains 13 run over the alined sprockets 9 and 10. At its front end the shaft 11 is provided with a bevel gear 14 that meshes with a bevel pinion 15 secured to one end of a transverse counter-shaft 16 mounted in suitable pedestal bearings 17 secured to the intermediate bars of the frame 1. This shaft 16 carries a pulley 18, a toothed cylinder 19, and two grooved pulleys 20 and 21. The teeth $19^a$ of the cylinder 19 extend obliquely or toward one side of the machine for a purpose which will hereinafter appear.

The numeral 22 indicates an explosive engine secured to the forward portion of the machine frame and having a crank shaft 23 provided with a driving pulley 24, over which and the pulley 18 of the shaft 16 runs a driving belt 25. Located below and slightly at the rear of the toothed cylinder 19 is a similar but preferably smaller toothed cylinder 26 having teeth $26^a$ that project obliquely or toward the same side of the machine as do the teeth $19^a$ of the cylinder 19. The shaft of the cylinder 26 is journaled in rearwardly projecting extensions $17^a$ of the bearing pedestal 17; and the said cylinder 26 is located nearly or quite within the large reticulate separating cylinder before described. The shaft of the cylinder 26 is shown as provided with a grooved pulley 7. A crossed belt 28 runs over the grooved pulley 20 of the cylinder shaft 16 and over the pulley 27 of the cylinder 26.

A forwardly inclined frame made up of a pair of laterally spaced metal bars 29 is pivotally attached at its rear end to the intermediate longitudinal bars $1^a$ of the frame 1, at points concentric to the axis of a transverse shaft 30 that is mounted in suitable bearings on the said bars 1ª; and it is provided with a large roller 31 located between said bars 1ª. The shaft 30 projects at one end and is provided with a grooved pulley 32 that alines with the pulley 21 of the shaft 16. A crossed belt 33 runs over the said pulleys 21 and 32 to impart motion from said shaft 16 to the shaft 30 and its roller 31. An idle guide roller 34 is journaled in the forwardly extended lower ends of the frame bars 29, and an endless elevator belt 35 runs over the rollers 31 and 34.

The plow for digging up the quack grass is connected to the free ends of the frame bars 29 and preferably comprises a yoke-like plow beam 36 rigidly secured to said bars 29, and a flat sharp nosed plow blade or shovel 37 that is rigidly secured to the said beam 36. This plow blade 37 is extended on such a line that it practically forms a downwardly curved forwardly projecting extension of the endless elevator belt 35. At the sides of the forward portion of the plow blade 37 is a pair of laterally spaced sharp edged wheels or disks 38 that are mounted in suitable bearings 39 secured to the sides of the yoke-like beam 36. A clevis 40 is shown as pivotally attached to the forwardly projecting portion of the plow beam 36 to serve as a simple means for the attachment of an equalizing beam or other draft device.

For the purpose of raising and lowering the plow, the beam 36 is shown as connected, by a link 41, to the short arm of a latch lever 42 that is pivoted to a bearing 43 rigidly secured to the front end portion of the frame 1. The latch lever 42 coöperates with a latch segment 44 rigidly secured to the said bearing 43.

The side bars of the frame 1 project at the rear and support a grass catching basket or receptacle 45, preferably constructed of canvas. For delivering the cleaned quack grass from the rotating reticulate separating cylinder into the basket 45, a narrow endless rake belt 46 is provided, and this belt is arranged to run over guide pulleys 47 and 48 and over a driving pulley 49. The driving pulley 49 is secured on the rear axle 3. The pulleys 47 and 48 are loosely journaled respectively in the forward and rear ends of a forwardly inclined supporting frame 50 rigidly secured to the main frame 1 and projecting into the rotary reticulate separating cylinder, so that the forward portion of the rake belt 46 is properly positioned to pick up the cleaned quack grass and deliver the same out of the said separating cylinder into the catch basket. Under the advanced movement of the machine the driving pulley 49 will impart traveling motion to the rake belt 46.

It will, of course, be understood that in lieu of the various pulleys and belt guiding rollers, toothed wheels or sprockets might be employed, in which case, of course, the endless conveyers will be made up, in whole or in part, of suitable coöperating sprocket chains.

For keeping the meshes of the reticulate separating cylinder cleaned, a pair of long brushes 51 are shown as secured to the fixed annular wheel racks 5 in position to engage the external surface of the reticulate section 8 of the said cylinder. The bars of these brushes also serve to tie together and rigidly space the upper portions of the said so-called wheel racks 5.

A segmental baffle plate or dash-board 52, supported by the frame 50, is located within the rotary reticulate separating cylinder and extends above the upper portion of the rake belt 46, in position to prevent the quack grass thrown rearward by the toothed cylinders 19 and 26 from being thrown completely through the said reticulate cylinder.

The operation of the improved quack grass digger above described is substantially as follows: Under the forward movement of the machine, the plow or shovel 37, when properly lowered, will dig up the quack grass, roots and all, together with a considerable amount of dirt, and this will be forced rearward onto the elevator belt 35. It will, of course, be understood that when the machine is in operation the engine 22 must be kept in operation so that the elevator belt 35 and toothed cylinders 19 and 26 will be kept under rotation at a quite high speed. By the elevator belt 35 the uplifted quack grass and dirt will be delivered between the two reversely driven toothed cylinders 19 and 26; and, in passing between said toothed cylinders, the quack grass will be torn up to a very great extent and the dirt will be loosened from the roots thereof. All of the cleaned quack grass and most of the dirt will be delivered into the rotary reticulate separating cylinder or drum 7—8. The lateral inclination of the pins on said cylinders has a tendency to throw the quack grass roots or tufts to one side of the rake belt 46, while the dirt will drop directly through the bottom of the reticulate cylinder section 8. Under rotation of the said reticulate separating cylinder the dirt will all be separated from the roots and precipitated to the ground, while the roots will be raked up by the belt 46 into the basket 45.

What I claim is:

1. In a machine of the kind described, the combination with a rotary reticulate cylinder open at its front and rear ends, of a plow for digging up the roots, a cylinder located at the front end of said reticulate cylinder and having teeth inclined toward one side of the machine, an endless belt for delivering the roots from said plow to said reticulate cylinder, and an endless rake belt operative to eject the cleaned roots at the rear end of said cylinder, substantially as described.

2. In a machine of the kind described, the combination with a wheeled truck, of a rotatively mounted reticulate cylinder open at front and rear ends, a plow for digging up the roots, a cylinder located at the front end of said reticulate cylinder and having teeth inclined toward one side of the machine, an elevator belt for delivering the roots from said plow to said toothed cylinder and from thence unto said reticulate cylinder, and means for imparting motion to the said cylinders and elevator belt, substantially as described.

3. In a machine of the kind described, the combination with a wheeled truck, of a reticulate cylinder open at front and rear ends and rotatively mounted on the frame of said truck, a pair of toothed cylinders at the front end of said reticulate cylinder, a plow for digging up the roots, an endless elevator belt for delivering the roots from said plow between said toothed cylinders, and means for driving said reticulate cylinder, toothed cylinders and elevator belt, substantially as described.

4. In a machine of the kind described, the combination with a wheeled truck, of a reticulate cylinder open at front and rear ends and rotatively mounted on the frame of said truck, a pair of coöperating toothed cylinders at the front end of said reticulate cylinder, having their teeth inclined toward one side of the machine, a plow for digging up the roots, an elevator belt for delivering the roots from said plow between said toothed cylinders, and means for driving said reticulate cylinder, toothed cylinders and elevator belt, substantially as described.

5. In a machine of the kind described, the combination with a wheeled truck, of a reticulate cylinder open at the front and rear ends and rotatively mounted on the frame of said truck, a pair of coöperating toothed cylinders at the front end of said reticulate cylinder, a plow adjustably supported from the truck frame in front of said toothed cylinders, and an endless elevator belt extending from said plow upward and rearward, for delivering the roots from said plow to said toothed cylinders, substantially as described.

6. The combination with a wheeled truck having a rear axle connected to the rear wheels, of a reticulate cylinder open at front and rear ends and rotatively mounted on the frame of said truck, an endless rake belt driven from said rear axle and extending through the open rear end of said reticulate cylinder, a plow for digging up the roots, a pair of coöperating toothed cylinders at the front end of said reticulate cylinder, and an elevator belt for delivering the roots from said plow to said toothed cylinders, substantially as described.

7. In a machine of the kind described, the combination with a wheeled truck, of a reticulate cylinder open at front and rear ends and rotatively mounted on the frame of said truck, means for digging up and delivering the roots into said reticulate cylinder through the front end thereof, and one or more brushes arranged for engagement with the reticulate section of said cylinder, substantially as described.

8. In a machine of the kind described, the combination with a wheeled truck, of a pair of parallel wheel-equipped annular racks, a reticulate cylinder rotatively mounted on the wheels of said racks, a toothed cylinder at the front end of said reticulate cylinder, a plow for digging up the roots, a belt for delivering the roots from said plow to said toothed cylinder, and an endless rake belt for discharging the cleaned roots out at the open rear end of said reticulate cylinder, substantially as described.

In testimony whereof I affix my signature in presence of two witnesses.

CASPER D. BRACKELSBERG.

Witnesses:
H. C. GUNDERSON,
ALOIS KEBER.